Aug. 16, 1938.                J. REST                    2,126,814
           METHOD AND APPARATUS FOR MAKING CONTAINERS
                 Original Filed June 29, 1933    3 Sheets-Sheet 1
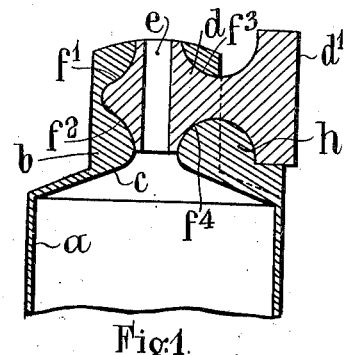
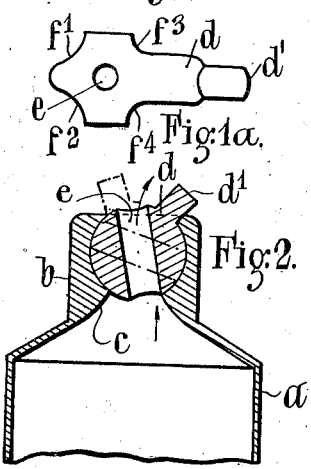
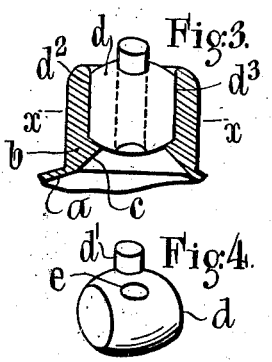
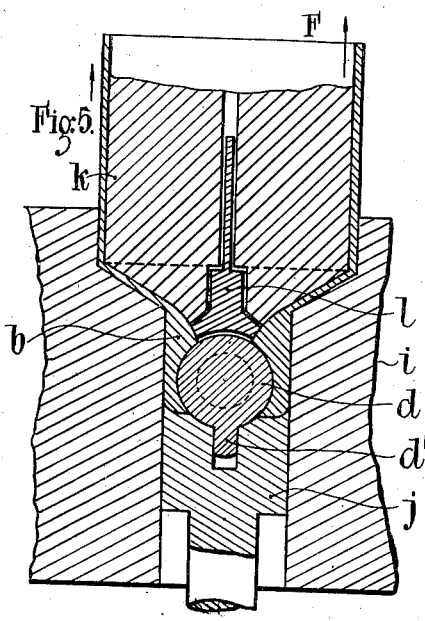
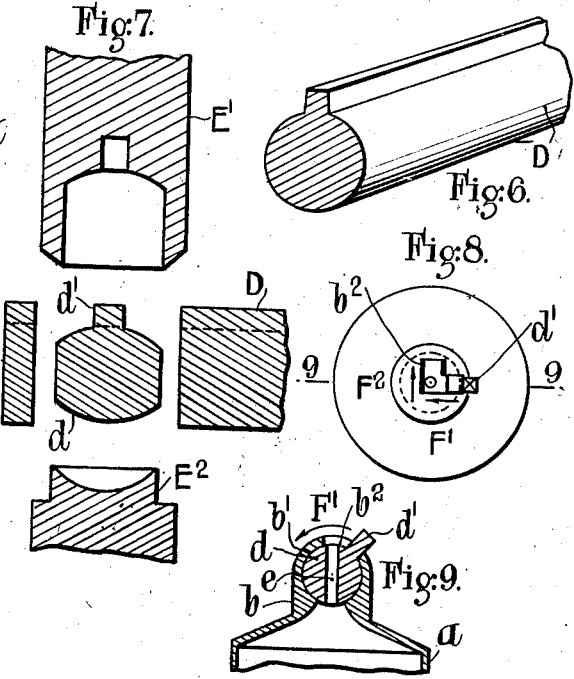
James Rest
INVENTOR
BY Thomas A. Jencks
ATTORNEY Aug. 16, 1938.  J. REST  2,126,814
METHOD AND APPARATUS FOR MAKING CONTAINERS
Original Filed June 29, 1933  3 Sheets-Sheet 2
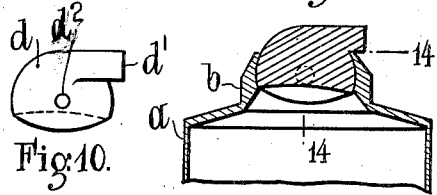
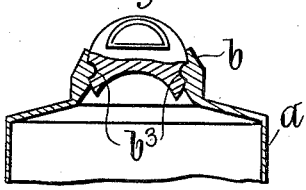
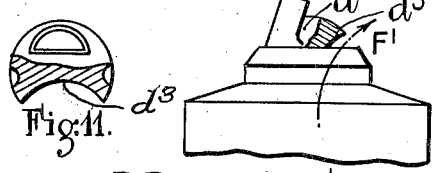
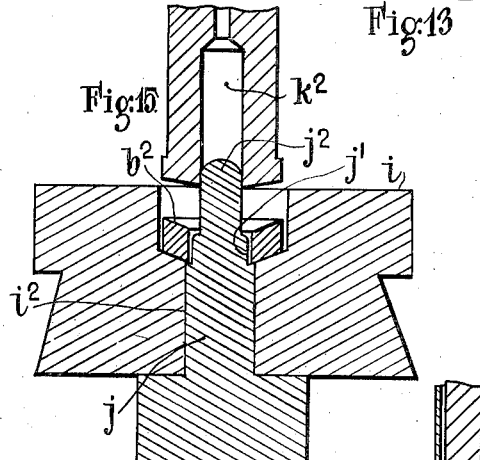
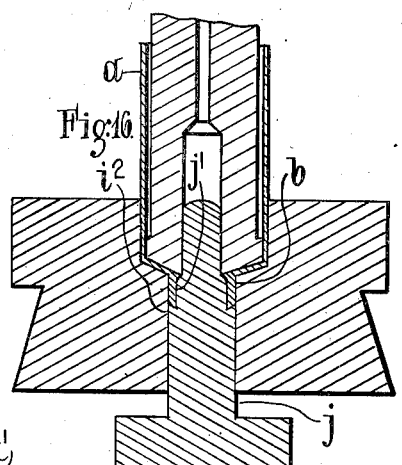
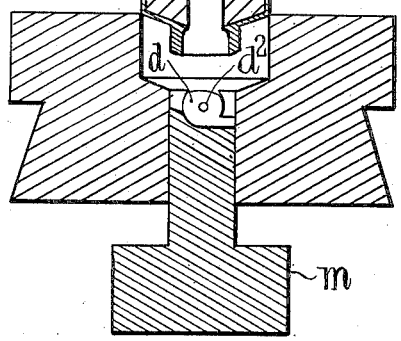
James Rest
INVENTOR
BY Thomas A. Jencks
ATTORNEY Aug. 16, 1938.    J. REST    2,126,814
METHOD AND APPARATUS FOR MAKING CONTAINERS
Original Filed June 29, 1933    3 Sheets—Sheet 3
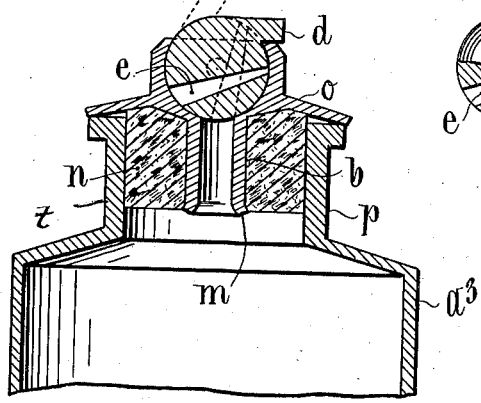
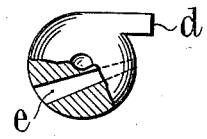
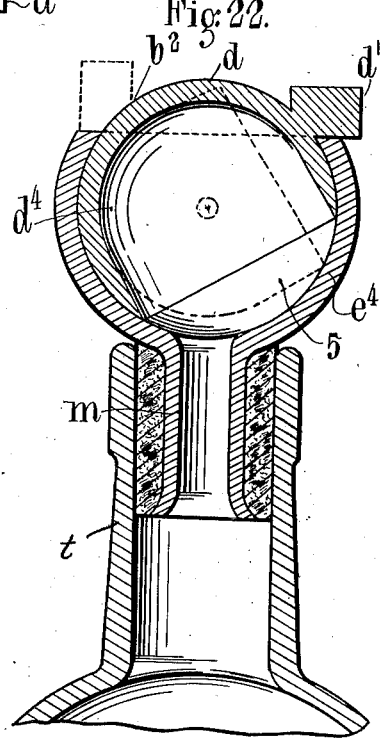
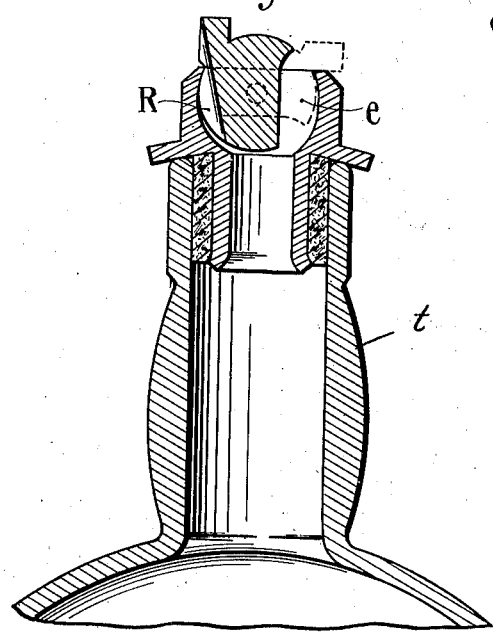
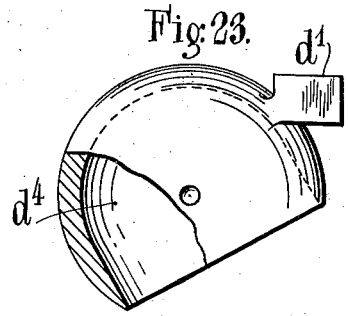
James Rest
INVENTOR.
BY Thomas A. Jenckes,
ATTORNEY Patented Aug. 16, 1938

2,126,814

UNITED STATES PATENT OFFICE 2,126,814

METHOD AND APPARATUS FOR MAKING CONTAINERS

James Rest, London, England, assignor to No-Kap Closures (U. S. A.) Inc., Providence, R. I., a corporation of Rhode Island Application June 29, 1933, Serial No. 678,133. Renewed November 10, 1937. In Great Britain July 5, 1932

25 Claims. (Cl. 207—10)

The present invention is a continuation in part of my copending patent application No. 629,007 filed 16th August 1932.

The present invention has for its object improvements in containers and more particularly in containers or tubes deformable by compression and containing fluid, viscous or pasty material.

According to the present invention, a container of the kind referred to comprises a movable closure member or stopper fixed at the extremity of the container, of which the material is pressed or extruded around it, and provided with an exterior finger or member for manipulative purposes allowing of its being displaced and for example of making it turn to open or close the container.

According to one way of carrying out the invention, the closure member comprises a diametrical conduit which may be brought into register with the prolongation of the neck or orifice of the container, when this latter is to be opened, or be angularly displaced so that the body of the closure member covers the said neck or orifice and ensures the closure.

The positioning of the closure member at the discharge end of the container is effected, according to one manner of carrying out the invention, during the formation of the container; and to this end, the closure member is placed in a mould of suitable shape, then above it, a round or blank of metal; this blank is then extruded by a punch for the one part round said closure member, forming thus the head of the container partly enclosing the closure member in a fluid-tight manner, and for the other part round the punch, thus forming the tube itself.

According to a modification both the head or neck of the container and the top of the container are formed in a first step by extruding between a punch and an appropriate matrix, then in the second step the closure member (which is provided with two recesses) is disposed in recesses in the neck, the bosses or pivots of the closure member being formed by the material of the neck which penetrates during this second step into the said recesses.

Further features of my invention relate to a novel type of closure means adapted to be used either with collapsible tubes or to serve as stoppers in connection with a cork or otherwise for any container, such as a bottle, etc., one embodiment of my invention being so constructed as to permit only one drop to be delivered at one time, another embodiment being provided with two vents for the free discharge of fluid therefrom and a still further embodiment being so constructed as to dispense a measured dose from the container.

Further features of my invention relate to the novel methods of manufacturing such a closure means for any type of container whether it be a bottle or a collapsible tube and in which I provide a neck member for the closure constructed of pressable material and preferably having a recess therein and I insert the closure means within said recess and press the metal of the neck or nozzle partially around said closure means to retain it within said recess.

So far as I am aware I am the first to provide an automatically movable member for closures for nozzles, which may be readily moved by hand from an open to a closed position and which is normally retained in position in the nozzle by the metal of the neck or nozzle itself being pressed around the outer portion thereof to retain it in said movable position.

The following description, with reference to the accompanying drawings, given by way of example, will make the improvements easily understood.

Fig. 1 shows a first way of carrying out the invention.

Fig. 1a is a plan of a part of the article shown in Fig. 1.

Fig. 2 is a modification.

Fig. 3 is a part section at 90° to Fig. 2.

Fig. 4 is a detailed perspective view of the closure member shown in Fig. 2.

Fig. 5 is a diagrammatic section showing the process of manufacture of the tube provided with its movable closure member.

Figs. 6 and 7 show the manner of manufacture of the closure member.

Fig. 8 is an end view of a tube provided with a different form of closure member.

Fig. 9 is a section on 9—9 of Fig. 8.

Fig. 10 is a detailed view relating to a manually operable modification of closure.

Fig. 11 is an elevation of the closure member shown in Fig. 10 partly in section.

Fig. 12 is a sectional view of the tube provided with its closure member in the closed position.

Fig. 13 is an exterior view of the tube, the closure member being in the open position and partly in section.

Fig. 14 is a section on 14—14 in Fig. 12.

Figs. 15 and 16 show the formation of the tube neck ready to receive the closure member illustrated in Figs. 10 and 11.

Fig. 17 shows the positioning of the closure member in the neck.

The remaining figures show still further embodiments of my invention applied to the stopper of a bottle.

Fig. 18 is a vertical sectional view showing an embodiment of my invention inserted within a bottle cork or as a bottle stopper and capable of delivering only one drop at a time.

Fig. 19 is a side elevation partially shown in section of the improved closure means of the embodiment shown in Fig. 18.

Fig. 20 is a vertical sectional view of a still further embodiment of my invention generally similar to that shown in Fig. 18, but having an air inlet vent to secure a rapid delivery of liquid from the mouth of the bottle thereof.

Fig. 21 is a side elevation of the closure means employed in Fig. 20.

Fig. 22 is a vertical sectional view of a still further embodiment of my invention applied as a stopper for a bottle which is capable of receiving and delivering a measured dose of material from within the container.

Fig. 23 is a side elevation of the closure means of the embodiment shown in Fig. 22.

In the embodiment illustrated in Figs. 1 to 3 the container $a$ which is deformable by compression, comprises a cylindrical nozzle or neck $b$ in which is partially enclosed a closure member $d$ so that it can turn, said closure member being provided with a conduit $e$ giving communication between the interior of the receptacle $a$ and the exterior. This closure member may be provided with a rear portion in the form of a flat key $d'$, whilst the body of the closure member is formed by a surface of revolution about an axis perpendicular to the surface of the tube and of which the generating line may be formed by the curves $f_1$, $f_2$, $f_3$, $f_4$. The curves may be replaced by straight lines, so that the closure member would then have the form of a double cone.

The nozzle $b$ comprises a housing which conforms in a fluid-tight manner to the form of the closure member, that is to say presents as hollows the surfaces of revolution or cones having for generatrices the curves or straight lines $f_1$, $f_2$, $f_3$, $f_4$.

The nozzle $b$ may or may not be provided with a shoulder $h$ on which is embedded the part forming the key $d'$ and which may form an abutment thereto in the open position.

The manufacture of the nozzle $b$ and the retention in place of the closure member $d$ are effected as will hereinafter be described by way of example, in regard to Figs. 2 and 5.

In the manner of manufacture illustrated in Fig. 2, the closure member has the form of a small barrel, that is to say is provided with two parallel plane retaining faces $d^2$, $d^3$ to which correspond the two equally plane and parallel retaining faces of the nozzle $b$.

The closure member may thus turn about the axis $x$—$x$ Fig. 3 which is normal to the axis of the container or tube, the manipulation being effected simply by turning the handle or key $d'$.

As before, the closure member comprises a conduit $e$ and it is seen on referring to Fig. 2 that, in the position indicated in full lines, the contents of the container or tube may be ejected from the tube in the direction of the arrows, when the opposite end of the tube $a$ is pinched in the usual manner. When the tube is finished with, it is sufficient to return the finger $d'$ into the direction indicated in dot and dash in Fig. 2 for the closure member to close the neck $c$ of the container or tube $a$ and prevent the contents of the tube or container coming out.

On referring to Figures 2 and 3 it is seen that the closure member is enclosed in a fluid tight manner on the nozzle $b$, so that it is permanently retained in the said nozzle and that it may in spite of that turn fully about the axis $x$—$x$, in other words the nozzle serves as a fluid tight support for the closure member.

The manufacture of the closure member may be carried out for example as represented in Figs. 6 and 7 starting from a drawn out rod of steel or other metal D which is placed between a cutting die E' and a counter-partal die $E^2$, Fig. 7 representing the operation after cutting the closure member $d$ in the rod D.

The conduit $e$ is then pierced in the closure member $d$.

Of course, the orifice in the closure member may be pierced after the latter has been put in place in the nozzle of the container or tube.

The disposition and the retention of the closure member $d$ in the nozzle $b$ of the tube or container $a$ may be obtained as will be hereinafter described with regard to Fig. 5, during the formation of the tube nozzle.

To this end, the closure member is disposed in the mould $i$ with its handle $d'$ turned downwards and engaged in a recess in the usual ejector $j$, which ensures the centering of the closure member. Above the closure member, in the usual manner, in the mould $i$ is placed a blank of suitable thickness made of metal or alloy from which the tube or container $a$ is to be formed.

The punch $k$, provided as usual with an air-escape valve $l$, is made to descend, the descent of the punch producing the compression of the blank and the flowing or extruding of the metal, for the one part around the closure member, between the latter and the base of the mould, thus forming the nozzle $b$ surrounding the said closure member, and for the other part, the extension of the metal which rises round the punch in the form of a tubular sheath in the direction of the arrows, thus forming the tube $a$.

When the operation is finished, the punch $k$ is raised, and, on actuating the ejector, the assembled tube and its closure member are disengaged the said assemblage being as indicated in Fig. 2, that is to say in the finished state.

The filling of the tube and its closing are effected in the usual manner.

In the form of embodiment illustrated in Figs. 8 and 9, closure member $d$, in place of having the form of a little barrel, is spherical and may be displaced in two perpendicular directions, the external face $b'$ of the nozzle being provided thus with a groove $b^2$ in the form of a right angle, as indicated in Figs. 8 and 9.

Under these conditions, on leaving the position of the said Fig. 9, at which the conduit $e$ puts the container $a$ in communication with the exterior, the tube or container can be closed on moving the handle $d'$ in the direction of the arrow F', as previously described with regard to the closure member illustrated in Fig. 2; but furthermore the security can be assured by pushing the handle $d'$ in the direction of the arrow $F^2$, that is to say in a direction perpendicular to the direction F', so that the said handle $d'$ may be thus held against all displacement in a sense opposite to the arrow F'.

To use the tube, and to open the closure member, the opposite procedure must be adopted, that is to say, the handle $d'$ must be made to undergo two consecutive displacements in perpendicular directions.

In the embodiment illustrated in Figs. 10 to 14 the closure member or stopper $d$, which is provided with a handle $d'$, is solid and of hemispherical form. It is provided with two recesses $d^2$ diametrically opposite into which the material forming the neck is pressed at the moment of positioning the closure member into the head or neck of the tube $a$; the teeth or projections $b^3$ (Fig. 14) formed by the entering the material into the recesses $d^2$ constitute the pivots or axes of oscillation of the closure member or stopper $d$. This latter is raised on its lower face as indicated at $d^3$ (Fig. 11) and it will be understood by reference to Figs. 12 and 13 that according as the handle $d'$ is in the lower or upper position, the receptacle is closed (Fig. 12) or open (Fig. 13).

In the latter case, the material contained in the tubes issues obliquely (as indicated by the arrow $F'$) between the upper edge of the neck and the wall $d^3$.

The manufacture of tube $a$ and of its neck $b$, also the positioning of the closure member $d$, illustrated in Figs. 10 and 11, in the recess or neck $b$, may be embodied as will be subsequently described with reference to Figs. 15, 16 and 17.

In the first step the blank of material $b^2$ destined to be extruded to form the neck and tube is disposed in the bottom of the matrix, about a piston $j$ provided with prolongation $j^2$ and with a spherical part $j'$ slightly projecting. The punch $k$ engaging the matrix is provided with a central conduit $k^2$ which the prolongation of the piston $j$ fits closely.

The different parts being in the position illustrated in Fig. 15, the piston $j$ is slightly lowered to bring it to the position illustrated in Fig. 16. The punch $k$ is lowered so that a certain amount of material enters the space between the spherical part $j'$ of the lowered piston $j$ and the wall $i^2$ of the central orifice of the matrix $i$ in which said piston is disposed, thus forming the neck $b$ of the receptacle.

Furthermore, metal is extruded between the punch $k$ and the matrix and leaves in the form of a tube $a$ (Fig. 16) around the said punch.

When the pressure terminates, the assemblage of the piston $j$ and of the punch $k$ has risen again until the piston $j$ returns to the position illustrated in Fig. 15, whilst the punch $k$ continues to be raised, which separates the neck $b$ and the spherical part $j'$ of the piston.

The piston $j$ is then replaced by another piston $m$ (Fig. 17) on which the closure member $d$ has been suitably disposed; and the said closure member is caused to enter the neck $b$ by the lowering of the punch, the metal of the neck being, during this operation, pushed back or pressed into the recess $d^2$ of the closure member and forming as above described the boss or pivot of the closure member. The punch $k$ is then raised and the tube is ejected simply by injection of air into the prolongation $k'$ of the central conduit $k^2$ of the punch $k$.

The closure of the tube formed, as has been indicated, by the stopper $d$, is absolutely air tight; and in spite of that the operation of opening the tube is extremely easy.

The closure member or stopper is run formed by running its material into a mould or is formed under pressure in the manner known in foundry work.

It is obvious therefore that I am the first to provide a nozzle closure means for necks or nozzles of liquid containers having a movable closure member oscillatable within said nozzle from an open position to a closed position to dispense the fluid therein, which is firmly retained in the nozzle, the metal of the nozzle itself being pressed around the outer end of the closure member and the improved method of its manufacture. In the embodiments hitherto described I have shown and described my invention as applied to a collapsible tube.

It may, however, if desired as shown in Figs. 18–23 be applied to a bottle, in which case the stopper $d$ is inserted as usual in the neck $b$, the lower portion $m$ of which may be suitably mounted within a suitable cork $n$ forming the stopper for the bottle $a^3$. If desired the neck or nozzle $d$ may be provided with the supplemental outwardly flaring flange $o$ adapted to rest on the upper end of the bottle neck $t$. In this instance the conduit or vent $e$ is constructed of tapering shape and of a size to only dispense a single drop at a time from within the bottle $a^3$ and hence may be used in similar fashion to a medicine dropper. The hole $e$ may be of any predetermined size to give the drip required. This type of dispenser will be extremely useful in dispensing drops of medicine, seasoning, bitters, etc. The embodiment shown in Figs. 20 and 21 is generally similar to the embodiment shown in Figs. 18 and 19 with the exception that in addition to the fluid discharge vent $e$ a supplemental air inlet R is provided to admit air within the bottle therethrough as the liquid is being withdrawn out through the outlet $e$, thereby providing a closure member which will permit a rapid discharge of liquid from within the container. I have shown in Fig. 22 a dispensing device for bottles generally similar to that shown in Figs. 18–21 with the exception that the nozzle $e$ is enlarged at $e^4$ near its upper end and the stopper member $d$ is made hollow as at $d^4$ and in place of being provided with the vent that goes all the way through, is provided with a sector shaped opening $f$, the closure means being otherwise constructed in similar fashion to that shown in the just described embodiment. This type of closure means is adapted to receive within the hollow interior $d^4$ of the closure member $d$ a measured dose of medicine, liquid, or other type of liquid through the opening $f$ therein, the bottle being tilted for dispensing purposes. When the hollow interior $d^4$ is suitably filled with liquid through the medium of the handle $d^1$ the stopper $d$ is tilted to an open position, thereby shutting off the supply of liquid from the neck $m$ by bringing the hollow closure member $d^4$ opposite it and bringing the open portion $f$ of the hollow stopper member in alignment with the opening $b^2$ in the top of the container and permitting the liquid to be dispensed therefrom. In the claims I employ the words "extruding dies" and "extruding", as defined on page 904 of Webster's New International Dictionary, 2d Edition, as "A set of shaping dies that cause small blocks of ductile metal to flow into any desired shape, especially into the form of cylindrical tubes for tooth pastes." Said definition is further limited by having the word "extrusion" means flowing through a hole and in more than one direction.

It is evident that modifications may be made in the devices above described, without departing from the scope of the invention. In particular, the closure member may be rendered movable not by rotation, but by rectilinear movement, that is to say that the tube is opened by pushing the closure member in one direction and the closure would be obtained by pulling the closure member in the opposite direction, the nozzle would then serve as a fluid tight guide.

What I claim and desire to secure by Letters Patent is:—

1. In an extrusion apparatus, a female die having a face for receiving a tube blank, said die being downwardly tapered to an annular nozzle forming hole depending centrally therein having a cylindrical outer surface and a valve seat forming partially spherical protuberance on the inner surface and a cooperating male die of slightly less circumference than that of said female die and having a cooperatingly tapered face and centrally shaped portion to compress said blank to simultaneously extrude the tube body in the annular space between said male and female dies, the tube flange between said tapered faces and said tube nozzle in said nozzle forming hole while simultaneously forming a partially spherical valve seat portion on the lower portion of the inner surface of said nozzle.

2. In an extrusion apparatus, a female die having a face for receiving a tube blank and an annular nozzle forming hole depending therein having a cylindrical outer surface and a valve seat forming partially spherical protuberance on the inner surface, and a cooperating male die of slightly less circumference than that of said female die and having a face to compress said blank to simultaneously extrude the tube body in the annular space between said male and female dies and said tube nozzle in said nozzle forming hole while simultaneously forming a partially spherical valve seat portion on the inner surface of said nozzle.

3. In an extrusion apparatus, a female die having a face for receiving a blank and an annular nozzle forming hole depending centrally therein having a cylindrical outer surface and a valve seat forming partially spherical protuberance on the inner surface and a cooperating male die having a cooperatingly tapered face and centrally shaped portion to compress said blank to extrude an annular flange in the space between said tapered male and female die faces and a nozzle in said nozzle forming hole while simultaneously forming a partially spherical valve seat portion on the inner surface of said nozzle.

4. In an extrusion apparatus, a female die for receiving a blank said die having an annular nozzle forming hole depending therein having a cylindrical outer surface and a valve seat forming partially spherical protuberance on the inner surface, and a cooperating male die having a face shaped to compress said blank to extrude said nozzle in said nozzle forming hole while simultaneously forming a partially spherical valve seat portion on the inner surface of said nozzle.

5. In an extrusion apparatus, a female die having a face for receiving a tube blank said die being downwardly tapered to an annular nozzle forming hole depending centrally therein having a cylindrical outer surface and a valve seat forming substantially spherical protuberance on the inner surface and a cooperating male die of slightly less circumference than that of said female die and having a cooperatingly tapered face and centrally shaped substantially spherical portion to compress said blank to simultaneouly extrude the tube body in the annular space between said male and female dies, the tube flange between said tapered faces and said tube nozzle in said nozzle forming hole while simultaneously forming a substantially spherical valve seat on the interior of said nozzle having dispensing holes in each end thereof.

6. In an extrusion apparatus, a female die having a face for receiving a tube blank and an annular nozzle forming hole depending therein having a cylindrical outer surface and a valve seat forming substantially spherical protuberance on the inner surface, and a cooperating male die of slightly less circumference than that of said female die and having a face to compress said blank to simultaneously extrude the tube body in the annular space between said male and female dies and said tube nozzle in said nozzle forming hole while simultaneously forming a substantially spherical valve seat on the interior of said nozzle having dispensing holes in each end thereof.

7. In an extrusion apparatus, a female die having a face for receiving a blank and an annular nozzle forming hole depending centrally therein having a cylindrical outer surface and a valve seat forming substantially spherical protuberance on the inner surface and a cooperating male die having a cooperatingly tapered face and centrally shaped portion to compress said blank to extrude an annular flange on the space between said tapered male and female die faces and a nozzle in said nozzle forming hole while simultaneously forming a substantially spherical valve seat on the interior of said nozzle having dispensing holes in each end thereof.

8. In an extrusion apparatus, a female die for receiving a blank said die having an annular nozzle forming hole depending therein having a cylindrical outer surface and a valve seat forming substantially spherical protuberance on the inner surface, and a cooperating male die having a face shaped to compress said blank to extrude said nozzle in said nozzle forming hole while simultaneously forming a substantially spherical valve seat on the interior of said nozzle having dispensing holes in each end thereof.

9. The method of manufacturing closure means for containers or tubes, which comprises pressure shaping a blank of ductile material to form a nozzle and around an at least partially spherical nozzle closure member having a turning lug thereon, and axis forming means located diametrically thereof; to form a partially spherical valve seat on the inner wall of said nozzle extending around, and partially over and partially under said closure member, with said turning lug projecting outwardly through the outer end of said nozzle, and to form bearing and retaining means diametrically of the inner wall of said valve seat in association with said axis forming means located diametrically of said closure member.

10. The method of manufacturing closure means for containers or tubes, which comprises pressure-shaping a blank of ductile material to form a nozzle and simultaneously form it around an at least partially spherical nozzle closure member having a turning lug thereon; to form a partially spherical valve seat on the inner wall of said nozzle extending around, and partially over and partially under said closure member, with said turning lug projecting outwardly through the outer end of said nozzle.

11. The method of manufacturing closure means for containers or tubes, which comprises pressure shaping a blank of ductile material to form a nozzle and around an at least a partially spherical nozzle closure member having a turning lug thereon, and axis forming means located diametrically thereof; to form a partially spherical valve seat on the inner wall of said nozzle extending around and partially over said closure member, with said turning lug projecting outwardly through the outer end of said nozzle; and to form bearing and retaining means diametrically of the inner wall of said valve seat in association with said axis forming means located diametrically of said closure member.

12. The method of manufacturing closure means for containers or tubes, which comprises extruding a blank of ductile material to form a nozzle and around an at least partially spherical nozzle closure member having a turning lug thereon and axis forming means located diametrically thereof; to form a partially spherical valve seat on the inner wall of said nozzle extending around, and partially over and partially under said closure member, with said turning lug projecting outwardly through the outer end of said nozzle; and to form bearing and retaining means diametrically of the inner wall of said valve seat in association with said axis forming means located diametrically of said closure member.

13. The method of manufacturing closure means for containers or tubes, which comprises extruding a blank of ductile material to form a nozzle and simultaneously form it around an at least partially spherical nozzle closure member having a turning lug thereon; to form a partially spherical valve seat on the inner wall of said nozzle extending around, and partially over and partially under said closure member; with said turning lug projecting outwardly through the outer end of said nozzle.

14. The method of manufacturing closure means for containers or tubes, which comprises extruding a blank of ductile material to form a nozzle and around an at least a partially spherical nozzle closure member having a turning lug thereon and axis forming means located diametrically thereon; to form a partially spherical valve seat on the inner wall of said nozzle extending around, and partially over said closure member, with said turning lug projecting outwardly through the outer end of said nozzle; and to form bearing means diametrically of the inner wall of said valve seat in association with said axis forming means located diametrically of said closure member.

15. The method of manufacturing closure means for containers or tubes, which comprises pressure shaping a blank of ductile material to form a nozzle and simultaneously form it around a nozzle closure member having a turning lug thereon; to form a valve seat on the inner wall of said nozzle extending around, and partially over and partially under said closure member, with said turning lug projecting outwardly through the outer end of said nozzle.

16. The method of manufacturing closure means for containers or tubes, which comprises extruding a blank of ductile material to form a nozzle and simultaneously form it around a nozzle closure member having a turning lug thereon; to form a valve seat on the inner wall of said nozzle extending around, and partially over and partially under said closure member, with said turning lug projecting outwardly through the outer end of said nozzle.

17. The method of manufacturing closure means for containers or tubes, which comprises pressure shaping a blank of ductile material to form a nozzle and around an at least partially spherical nozzle closure member having a turning lug thereon and axis forming means located diametrically thereof; the method comprising at least two stages in the first stage of which the ductile metal blank is extruded to form the nozzle and the inner wall thereof shaped to approximately the shape of the lower valve seat portion for the closure member and thereafter the closure member is disposed in position on said lower valve seat portion with the turning lug extending through the outer end of the nozzle and the ductile metal is further pressure-shaped to form a partially spherical valve seat on the inner wall of said nozzle extending around, and partially over and partially under said closure member, with said turning lug projecting outwardly through the outer end of said nozzle, and to form bearing and retaining means diametrically of the inner wall of said valve seat in association with said axis forming means located diametrically of said closure member.

18. The method of manufacturing closure means for containers or tubes, which comprises pressure shaping a blank of ductile material to form a nozzle and around an at least partially spherical nozzle closure member having a turning lug thereon and axis forming means located diametrically thereof; the method comprising at least two stages in the first stage of which the ductile metal blank is pressure-shaped to form the nozzle and the inner wall thereof shaped to approximately the shape of the lower valve seat position for the closure member and the closure member is disposed in position on said lower valve seat portion with the turning lug extending through the outer end of the nozzle and the ductile metal further pressure-shaped to form a partially spherical valve seat on the inner wall of said nozzle extending around, and partially over and partially under said closure member, with said turning lug projecting outwardly through the outer end of said nozzle, and to form bearing and retaining means diametrically of the inner wall of said valve seat in association with said axis forming means located diametrically of said closure member.

19. The method of manufacturing closure means for containers or tubes, which comprises pressure shaping a blank of ductile material to form a nozzle and around an at least partially spherical nozzle closure member having a turning lug thereon; the method comprising at least two stages in the first stage of which the ductile metal blank is extruded to form the nozzle and the inner wall thereof shaped to approximately the shape of the lower valve seat portion for the closure member and the closure member is disposed in position on said lower valve seat portion with the turning lug extending through the outer end of the nozzle and the ductile metal is further pressure-shaped to form a partially spherical valve seat on the inner wall of said nozzle extending around, and partially over and partially under said closure member, with said turning lug projecting outwardly through the outer end of said nozzle.

20. The method of manufacturing closure means for containers or tubes, which comprises pressure shaping a blank of ductile material to form a nozzle and around an at least partially spherical nozzle closure member having a turning lug thereon and axis forming means located diametrically thereof; the method comprising at least two stages in the first stage of which the ductile metal blank is extruded to form the nozzle and the inner wall thereof shaped to approximately the shape of the valve seat for the closure member and the closure member is disposed in position on said valve seat with the turning lug extending through the outer end of the nozzle and the ductile metal is further pressure-shaped to form a partially spherical valve seat on the inner wall of said nozzle extending around, and partially over said closure member, with said turning lug projecting outwardly through the outer end of said nozzle; and to form bearing means diametrically of the inner wall of said valve seat in association with said axis forming means located diametrically of said closure member.

21. The method of manufacturing closure means for containers or tubes, which comprises pressure shaping a blank of ductile material to form a nozzle and around an at least partially spherical nozzle closure member having a turning lug thereon and axis forming means located diametrically thereof; the method comprising at least two stages in the first stage of which the ductile metal blank is pressure-shaped to form the nozzle and the inner wall thereof shaped to approximately the shape of the valve seat for the closure member and the closure member is disposed in position on said valve seat with the turning lug extending through the outer end of the nozzle and the ductile metal further pressure-shaped to form bearing means diametrically of the inner wall of said valve seat in association with said axis formng means located diametrically of said closure member.

22. The method of manufacturing closure means for containers or tubes, which comprises pressure shaping a blank of ductile material to form a nozzle and around a nozzle closure member having a turning lug thereon; the method comprising at least two stages in the first stage of which the ductile metal blank is extruded to form the nozzle and the inner wall thereof shaped to approximately the shape of the lower valve seat portion for the closure member and thereafter the closure member is disposed in position on said lower valve seat portion with the turning lug extending through the outer end of the nozzle and the ductile metal is further pressure-shaped to form a valve seat on the inner wall of said nozzle extending around, and partially over and partially under said closure member, with said turning lug projecting outwardly through the outer end of said nozzle.

23. The method of manufacturing closure means for containers or tubes comprising at least two stages, in the first stage of which the ductile metal is pressure shaped to form a nozzle having a wall thereof shaped to approximately the shape of a valve seat for a closure member, and thereafter the closure member is disposed in position on said valve seat and the ductile metal further pressure shaped to form bearing means diametrically of the wall of said valve seat in association with axis forming means formed diametrically of said closure member.

24. The method of manufacturing closure means for containers or tubes, which comprises pressure shaping a blank of ductile material to form a nozzle and around an at least partially spherical nozzle closure member having a turning lug thereon and axis forming means located diametrically thereof; the method comprising at least two stages, in the first stage of which the ductile metal blank is pressure shaped to form the nozzle, and thereafter the closure member is disposed in position in said nozzle with the turning lug extending through the outer end of the nozzle and the ductile metal is further pressure-shaped to form a partially spherical valve seat on the inner wall of said nozzle extending around, and partially over, said closure member, with said turning lug projecting outwardly through the outer end of said nozzle; and to form bearing and retaining means diametrically of the inner wall of said valve seat in association with said axis forming means located diametrically of said closure member.

25. The method of manufacturing closure means for containers or tubes, which comprises pressure shaping a blank of ductile material to form a nozzle and around a nozzle closure member having a turning lug thereon; the method comprising at least two stages, in the first stage of which the ductile metal blank is pressure shaped to form the nozzle and thereafter the closure member is disposed in position in said nozzle with the turning lug extending through the outer end of the nozzle and the ductile metal is further pressure-shaped to form a valve seat on the inner wall of said nozzle extending around and partially over and partially under said closure member, with said turning lug projecting outwardly through the outer end of said nozzle.

JAMES REST.